US011050447B1

(12) United States Patent
Ganje et al.

(10) Patent No.: US 11,050,447 B1
(45) Date of Patent: Jun. 29, 2021

(54) SYSTEM AND METHOD FOR REMOVING INTERFERER SIGNALS

(71) Applicant: Rockwell Collins, Inc., Cedar Rapids, IA (US)

(72) Inventors: Stephen A. Ganje, Frisco, TX (US); Nathan Larsen, Allen, TX (US); Yongtao Guo, Plano, TX (US); Jeffrey L. Box, Farmersville, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/780,491

(22) Filed: Feb. 3, 2020

(51) Int. Cl.
*H04B 1/10* (2006.01)
*H04K 3/00* (2006.01)
*H04B 1/08* (2006.01)

(52) U.S. Cl.
CPC ............... *H04B 1/10* (2013.01); *H04B 1/082* (2013.01); *H04K 3/20* (2013.01)

(58) Field of Classification Search
CPC ... H04B 1/00; H04B 1/10; H04B 1/12; H04B 1/082; H04B 1/1027; H04B 15/00; H04B 17/345; H04J 11/00; H04K 1/00; H04K 3/20; H04L 25/03; H04L 27/00; H04L 27/26; H04L 27/28; H04W 4/00; H04W 24/02; H04W 24/08; H04W 72/08
USPC ........ 370/203, 210, 329; 375/224, 232, 260, 375/316, 334, 340, 349
See application file for complete search history.

(56) References Cited

U.S. PATENT DOCUMENTS

| | | | |
|---|---|---|---|
| 4,287,475 A | 9/1981 | Eaton et al. | |
| 5,825,898 A | 10/1998 | Marash | |
| 6,266,633 B1* | 7/2001 | Higgins | G10L 21/0208 704/224 |
| 7,778,153 B2* | 8/2010 | Choi | H04L 27/2655 370/210 |
| 9,325,550 B1* | 4/2016 | Chavez | G01S 5/0215 |
| 9,954,713 B2* | 4/2018 | Alloulah | H04L 27/265 |
| 9,985,805 B1 | 5/2018 | Swenholt et al. | |
| 2007/0070882 A1* | 3/2007 | Kawauchi | H04L 25/0232 370/210 |
| 2011/0142254 A1* | 6/2011 | Bal | G10L 21/0208 381/94.1 |
| 2011/0235688 A1* | 9/2011 | Umeda | H04L 5/0048 375/216 |
| 2014/0064419 A1* | 3/2014 | Arambepola | H04L 27/2688 375/349 |

(Continued)

FOREIGN PATENT DOCUMENTS

CA 2259256 C 12/1997
GB 2304000 B 3/1997

*Primary Examiner* — Shawkat M Ali
(74) *Attorney, Agent, or Firm* — Suiter Swantz pc llo

(57) ABSTRACT

A system may include a receiver, an input digitized data buffer, and a processor. The input digitized data buffer may be configured to accumulate samples of a time domain signal, s(t), from the receiver. The processor may be configured to: remove a confirmed peak from a frequency domain signal, S(f), to produce a corrected frequency domain signal, S'(f); perform an inverse fast Fourier transform to transform the corrected frequency domain signal, S'(f), to a corrected time domain signal, s'(t); perform an inverse window operation on the corrected time domain signal, s'(t), to recover original signal magnitudes; and output digitized data of the corrected time domain signal, s'(t), for signal processing.

15 Claims, 17 Drawing Sheets

(56) References Cited

U.S. PATENT DOCUMENTS

2017/0180160 A1  6/2017  Moorti et al.
2017/0187418 A1  6/2017  Dafesh et al.
2018/0131403 A1  5/2018  Dafesh et al.

* cited by examiner

US 11,050,447 B1

SYSTEM AND METHOD FOR REMOVING INTERFERER SIGNALS

GOVERNMENT LICENSE RIGHTS

This invention was made with government support under government contract number FA8735-18-C-0001, awarded by the Air Force on May 14, 2018. The government has certain rights in the invention.

CROSS-REFERENCE TO RELATED APPLICATIONS

The present application is related to U.S. patent application Ser. No. 15/648,256, filed Jul. 12, 2017, issued as U.S. Pat. No. 9,985,805 on May 29, 2018, which is incorporated by reference in its entirety.

BACKGROUND

The frequency shift keying (FSK) waveform, often used for unencrypted radio transmission, typically has no interferer protection. FSK signals suffer from a reduced signal to noise plus interference ratio (SINR) in the presence of interferers, resulting in a reduced transmission range.

SUMMARY

In one aspect, embodiments of the inventive concepts disclosed herein are directed to a system. The system may include a receiver, an input digitized data buffer, and a processor. The input digitized data buffer may be configured to accumulate samples of a time domain signal, s(t), from the receiver. The processor may be configured to: perform a window operation on the time domain signal, s(t); perform a fast Fourier transform (FFT) to transform the time domain signal, s(t), to a frequency domain signal, S(f); calculate an interferer detection threshold (IDT) by using the frequency domain signal, S(f); search for and identify peaks of possible interferer signals by using the frequency domain signal, S(f), and the IDT; match newly detected peaks with previously detected peaks to determine persistence; determine a peak to be a confirmed peak once the peak has persisted for a predetermined amount of time; remove the confirmed peak from the frequency domain signal, S(f), to produce a corrected frequency domain signal, S'(f); perform an inverse FFT (IFFT) to transform the corrected frequency domain signal, S'(f), to a corrected time domain signal, s'(t); perform an inverse window operation on the corrected time domain signal, s'(t), to recover original signal magnitudes; and output digitized data of the corrected time domain signal, s'(t), for signal processing.

In a further aspect, embodiments of the inventive concepts disclosed herein are directed to a method. The method may include: accumulating, by an input digitized data buffer, samples of a time domain signal, s(t), from a receiver; performing, by at least one processor, a window operation on the time domain signal, s(t); performing, by the at least one processor, a fast Fourier transform (FFT) to transform the time domain signal, s(t), to a frequency domain signal, S(f); calculating, by the at least one processor, an interferer detection threshold (IDT) by using the frequency domain signal, S(f); searching for and identifying, by the at least one processor, peaks of possible interferer signals by using the frequency domain signal, S(f), and the IDT; matching, by the at least one processor, newly detected peaks with previously detected peaks to determine persistence; determining, by the at least one processor, a peak to be a confirmed peak once the peak has persisted for a predetermined amount of time; removing, by the at least one processor, the confirmed peak from the frequency domain signal, S(f), to produce a corrected frequency domain signal, S'(f); performing, by the at least one processor, an inverse FFT (IFFT) to transform the corrected frequency domain signal, S'(f), to a corrected time domain signal, s'(t); performing, by the at least one processor, an inverse window operation on the corrected time domain signal, s'(t), to recover original signal magnitudes; and outputting, by the at least one processor, digitized data of the corrected time domain signal, s'(t), for signal processing.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
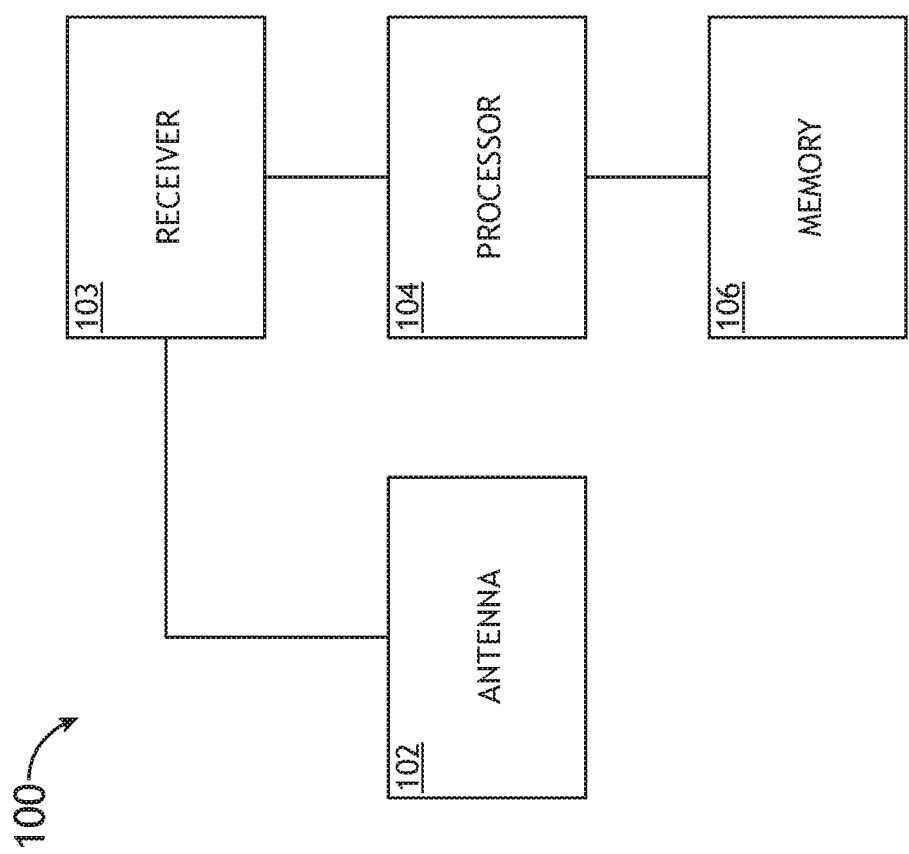
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a method and a system configured to remove interferer signals.

Some embodiments may identify and remove interferer signals (e.g., narrowband interferer signals) from very-low-frequency (VLF)/low-frequency (LF) signals. Some embodiments utilize knowledge of an expected signal to set a threshold that not only allows for detection of continuous wave (CW) interferers, but also may protect a FSK signal from being inadvertently removed as well. A verification mechanism can check for signal persistence to help eliminate false detections on the FSK signal and may allow the threshold to be as low as possible. Some embodiments may use a windowing function to minimize spectral leakage and may allow robust removal of the interferers. In some embodiments, fast Fourier transform (FFT) processing may be distributed over time, and the data may be processed in larger chunks to reduce execution frequency and fit within real-time constraints.

In some embodiments, performance of an algorithm to remove interferers (e.g., a Spectral Peaks algorithm) may have no limitations on multiple interferers, regardless of relative magnitude. The algorithm's threshold calculation can not only detect CW interferers, but also may protect the FSK signal. The algorithm's windowing function may avoid spectral leakage and may robustly identify interferers for removal. The algorithm may also protect other signals in the same data stream and can significantly improve the transmission range performance of a VLF receiver in the presence of CW interferers.

Referring now to FIG. 1, an exemplary embodiment of a system 100 according to the inventive concepts disclosed herein is depicted. The system 100 may be implemented as any suitable system, such as a vehicular system (e.g., an aircraft system; e.g., including at least one aircraft, at least one watercraft, at least one submersible craft, at least one automobile, at least one spacecraft, at least one satellite, and/or at least one train) and/or a communications system. For example, as shown in FIG. 1, the system 100 may include at least one antenna 102, at least one receiver 103, at least one processor 104, and/or at least one computer readable medium (e.g., memory 106), some or all of which may be communicatively coupled at any given time.

The antenna 102 may be configured to receive signals. For example, the antenna 102 may be configured to receive desired signals and interferer signals.

The receiver 103 (e.g., a data receiver) may be configured to receive the desired signals and interferer signals from the antenna 102 and output samples of a time domain signal, s(t), to the at least one processor 104.

The at least one processor 104 may be implemented as any suitable type and number of processors. For example, the at least one processor 104 may include at least one general purpose processor (e.g., at least one central processing unit (CPU)), at least one digital signal processor (DSP), at least one application specific integrated circuit (ASIC), and/or at least one field-programmable gate array (FPGA). The at least one processor 104 may be configured to perform (e.g., collectively perform if more than one processor) any or all of the operations disclosed throughout. The processor 104 may be configured to run various software applications (e.g., Spectral Peaks algorithm software) or computer code stored (e.g., maintained) in a non-transitory computer-readable medium (e.g., memory 106) and configured to execute various instructions or operations. For example, the at least one processor 104 may be configured to perform a Spectral Peaks algorithm, as exemplarily shown and described with respect to FIG. 2.

For example, the at least one processor 104 may be configured to: perform a window operation (e.g., a Blackman window operation) on a time domain signal, s(t), wherein a Blackman window has a size of $2^N$ (e.g., wherein performance of the Blackman window operation comprises multiplying elements in the time domain signal, s(t), by a corresponding scalar in the Blackman window); perform a fast Fourier transform (FFT) to transform the time domain signal, s(t), to a frequency domain signal, S(f); calculate an interferer detection threshold (IDT) by using the frequency domain signal, S(f); search for and identify peaks of possible interferer signals by using the frequency domain signal, S(f), and the IDT; match newly detected peaks with previously detected peaks to determine persistence; determine a peak to be a confirmed peak once the peak has persisted for a predetermined amount of time; remove the confirmed peak from the frequency domain signal, S(f), to produce a corrected frequency domain signal, S'(f); perform an inverse FFT to transform the corrected frequency domain signal, S'(f), to a corrected time domain signal, s'(t); perform an inverse window operation (e.g., an inverse Blackman window operation) on the corrected time domain signal, s'(t), to recover original signal magnitudes; and/or output digitized data (e.g., frames) of the corrected time domain signal, s'(t), for signal processing. Further, for example, the at least one processor 104 may be configured to store identified peaks in a peak list, wherein previously detected peaks are stored in the peak list and to remove a stored peak from the peak list when the stored peak no longer matches current peaks. Further, for example, the at least one processor 104 may be configured to output the digitized data (e.g., frames) of the corrected time domain signal, s'(t), for signal processing. Further, for example, the at least one processor 104 may be configured to perform a bypass operation to output an unprocessed time domain signal if the unprocessed time domain signal lacks confirmed peaks (e.g., wherein the outputted unprocessed time domain signal has a same latency as a processed signal). Further, for example, the at least one processor 104 may be configured to process multiple digitized data (e.g., frames) simultaneously (e.g., a set of frames may be processed at a same time) and to output multiple digitized data (e.g., frames) of the corrected time domain signal, s'(t), simultaneously (e.g., a set of frames may be output at a same time).

For example, the memory 106 may be external memory used by the processor 104.

Figure 2:
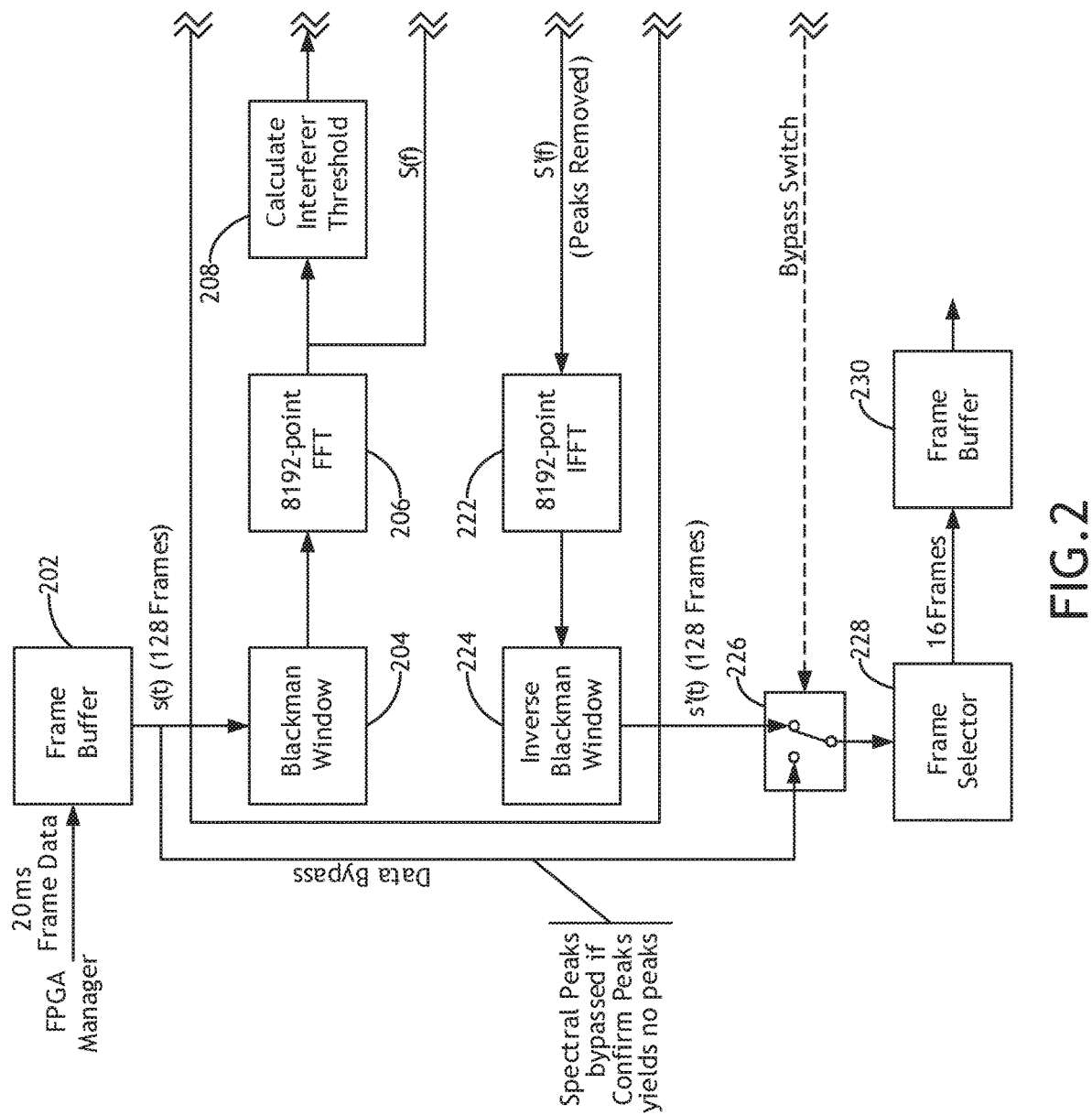
FIG. 2 is an exemplary diagram of a portion of the system of FIG. 1 and the processor of FIG. 1 performing a Spectral Peaks algorithm of an exemplary embodiment according to the inventive concepts disclosed herein.
Figure 2:
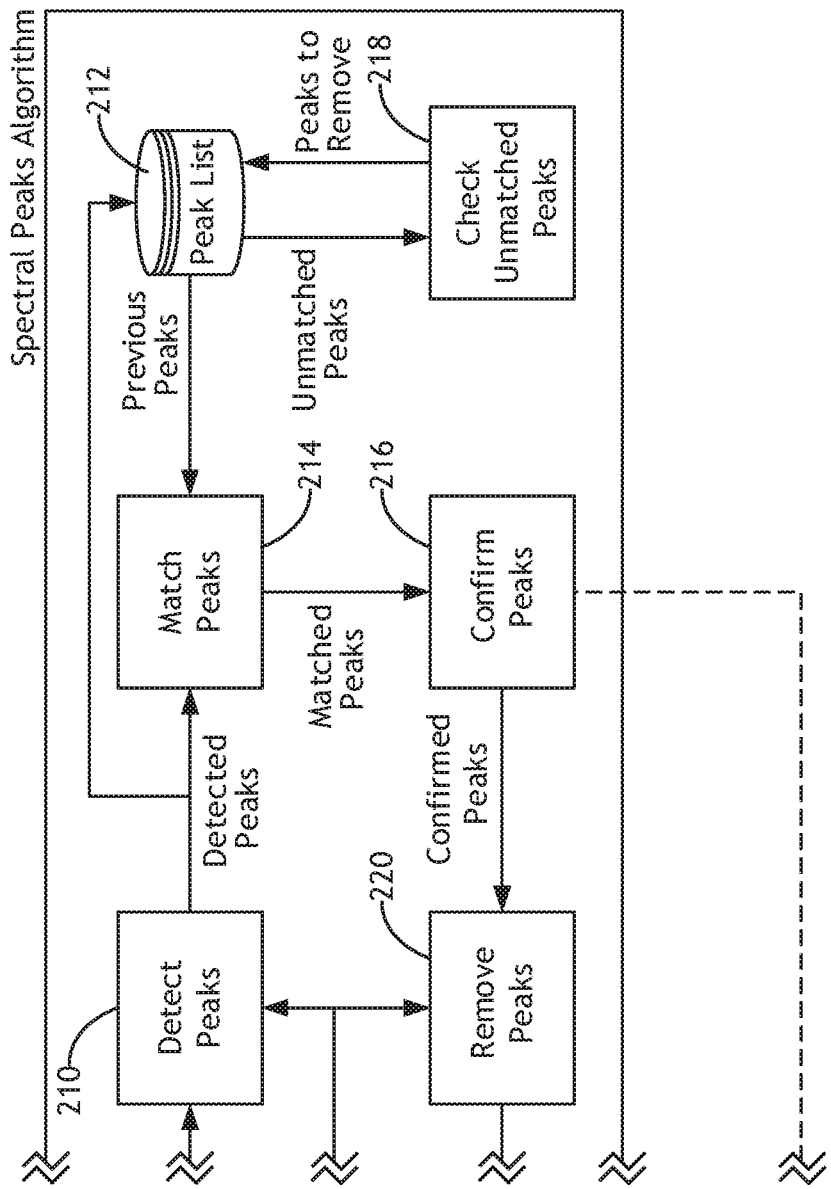

Referring now to FIG. 2, an exemplary diagram of a portion of the system 100 of FIG. 1 and the processor 104 of FIG. 1 performing a Spectral Peaks algorithm of an exemplary embodiment according to the inventive concepts disclosed herein is depicted. The system 100 of FIG. 1 may further include and/or may utilize an input digitized data buffer (e.g., an input frame buffer 202), a bypass switch 226, a digitized data selector (e.g., a frame selector 228), and/or an output digitized data buffer (e.g., an output frame buffer 230), some or all of which may be communicatively coupled at any given time. The processor 104 may be configured to perform the Spectral Peaks algorithm.

The input digitized data buffer (e.g., the input frame buffer 202) may be configured to accumulate $2^N$ samples of a time domain signal, s(t), from the receiver 103. For example, the input frame buffer 202 may be a sliding window frame buffer. The input frame buffer 202 may be configured to accumulate any suitable number of samples, such as 8192. In some embodiments, the at least one memory 106 includes the input frame buffer 202. In some embodiments, the input frame buffer 202 may be implemented within the processor 104.

In an exemplary embodiment, the input frame buffer 202 may accumulate 128, 20 ms frames equating to 8,192 samples. At startup, an unfilled portion of the buffer window may be set to zero. Once the extraction location has been filled (e.g., 72 frames), a first transform can begin. The filter processing may occur over the next 15 frames. On the 87th frame, the first 16 frames of data may be available, and these frames may be consumed at a frame rate as the next round of filter processing is happening in the background.

The processor 104 may be configured to perform the Spectral Peaks algorithm, which may include the following steps: a window operation (e.g., a Blackman window 204), FFT 206, calculate interferer threshold 208, detect peaks 210, peak list 212, match peaks 214, confirm peaks 216, check unmatched peaks 218, remove peaks 220, IFFT 222, and/or an inverse window operation (e.g., inverse Blackman window 224).

With respect to the window operation (e.g., the Blackman window 204), the processor 104 may be configured to perform a window operation (e.g., a Blackman window operation) on the time domain signal, s(t), wherein the window (e.g., the Blackman window) has a size of $2^N$. While in some embodiments the window operation may be a Blackman window operation, other embodiments may use any suitable window operation. For example, the Blackman window operation may include multiplying elements in the s(t) window by a corresponding scalar in the Blackman window. A non-windowed FFT can result in significant spectral leakage and inhibit the ability to remove a CW jammer. The Blackman window can be used to funnel jammer energy into a set of bins. An exemplary embodiment may use six bins for optimal CW removal performance, though any suitable number of bins may be used in other embodiments. Regardless of FFT size, a same number of bins may need removal. For example, a larger FFT size reduces bin width, which may reduce damage to a remaining signal. The Blackman window step may make the jammer removal process more robust.

With respect to the FFT 206, the processor 104 may be configured to perform a fast Fourier transform (FFT) to transform the time domain signal, s(t), to a frequency domain signal, S(f). In some embodiments, the FFT processing represents the majority of processing load for performing the Spectral Peaks algorithm. The FFT transform may make $\log_2(N)$ passes over the data (e.g., 8192 samples would take 14 passes). For example, these passes can be easily distributed across several frames to minimize processor load that may occur on any single frame. In an exemplary embodiment, the Spectral Peaks algorithm may use 16 frames per filter execution—8 frames for FFT and peak detection processing (~2 FFT passes per frame) and 8 frames for IFFT and peak removal processing (e.g., which can be bypassed if no peaks are detected). The distributed processing may help minimize the impact of choosing a different sized FFT. For example, a 16K FFT may use 32 frames per execution; a 4K FFT may use 8 frames per execution. For example, choosing more frames per filter execution may distribute FFT execution across more frames up to the maximum number of passes needed to perform FFT.

Figure 3A:
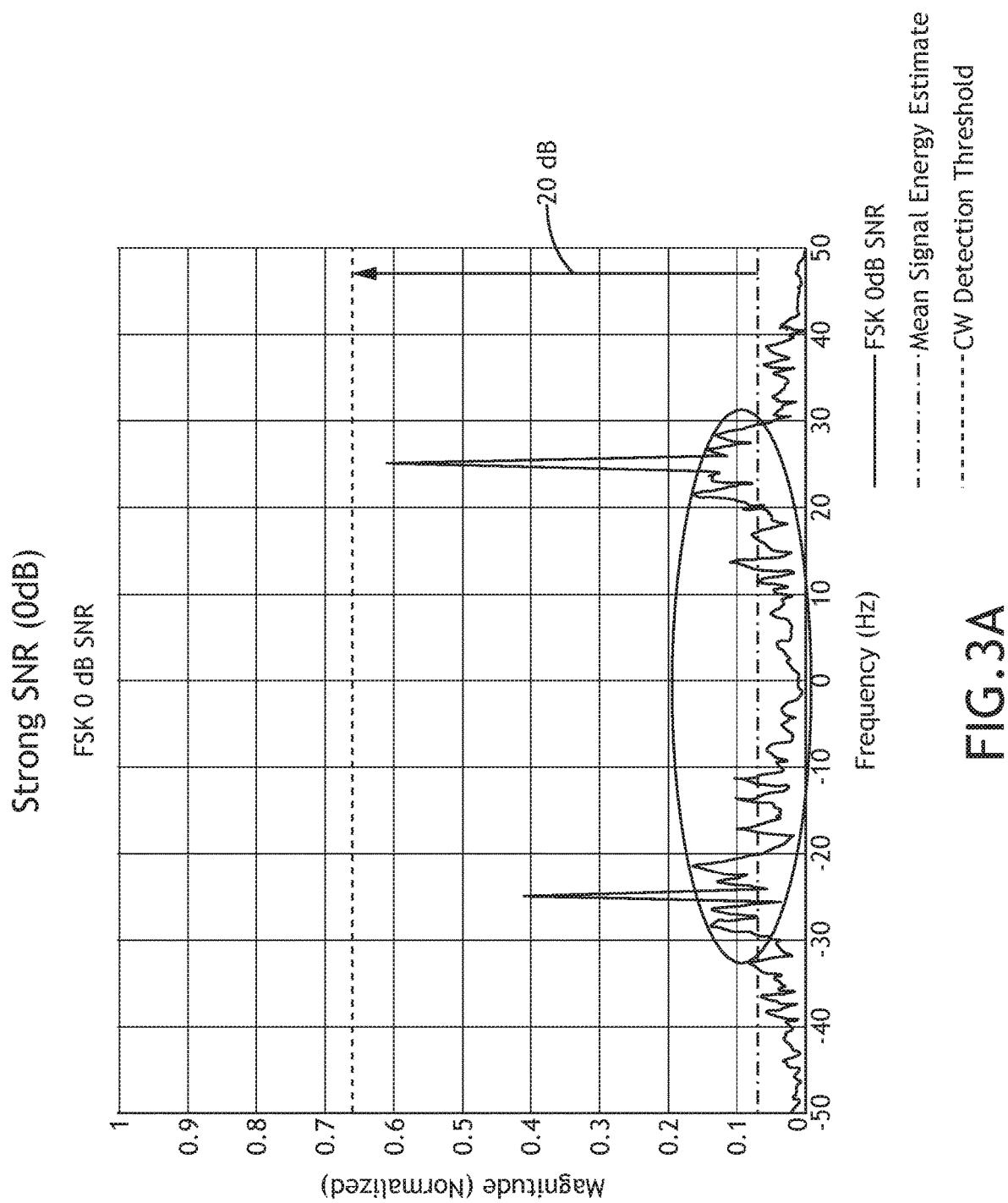
FIGS. 3A and 3B show exemplary graphs related to calculating the interferer detection threshold of some embodiments according to the inventive concepts disclosed herein.
Figure 3B:
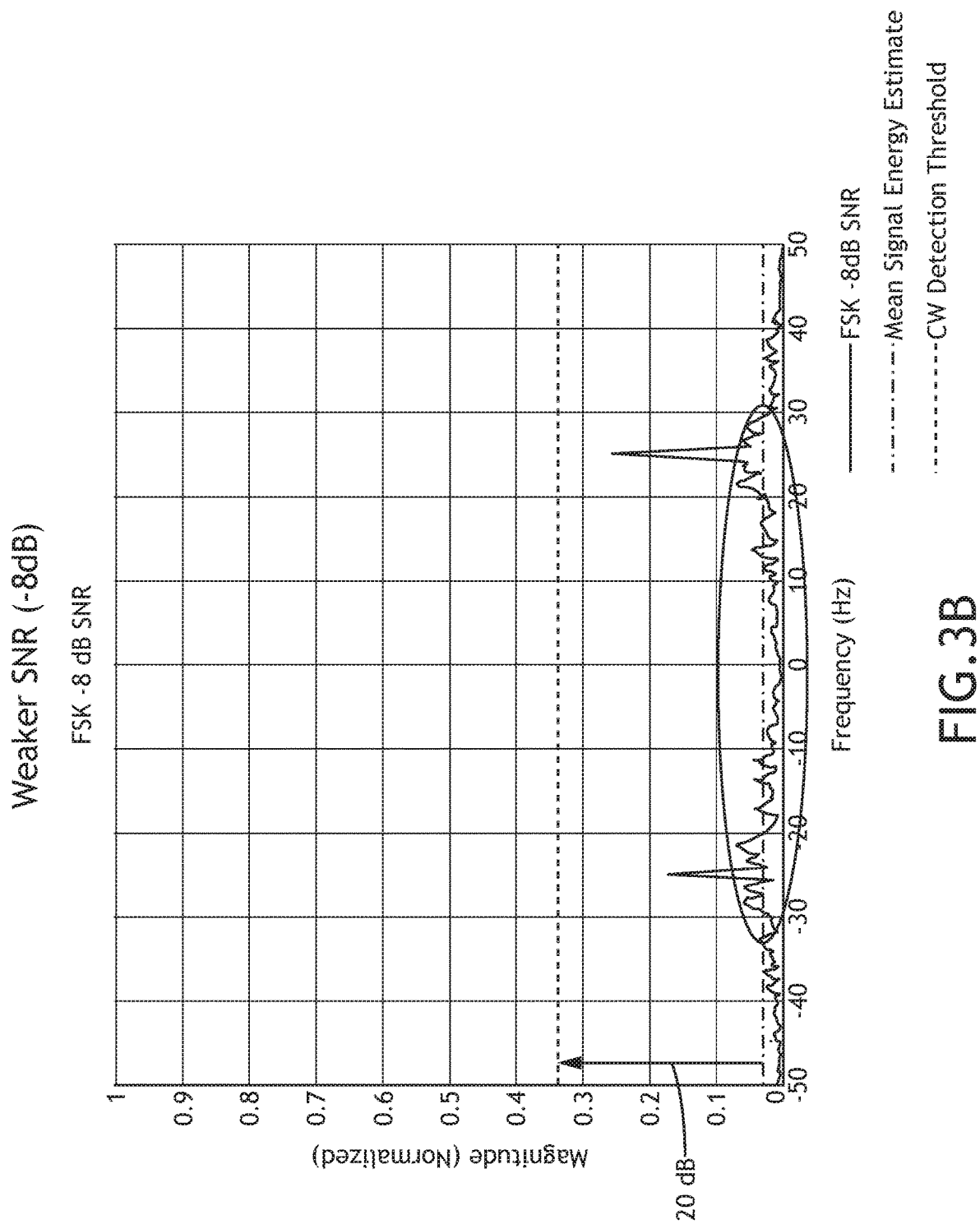
Figure 4A:
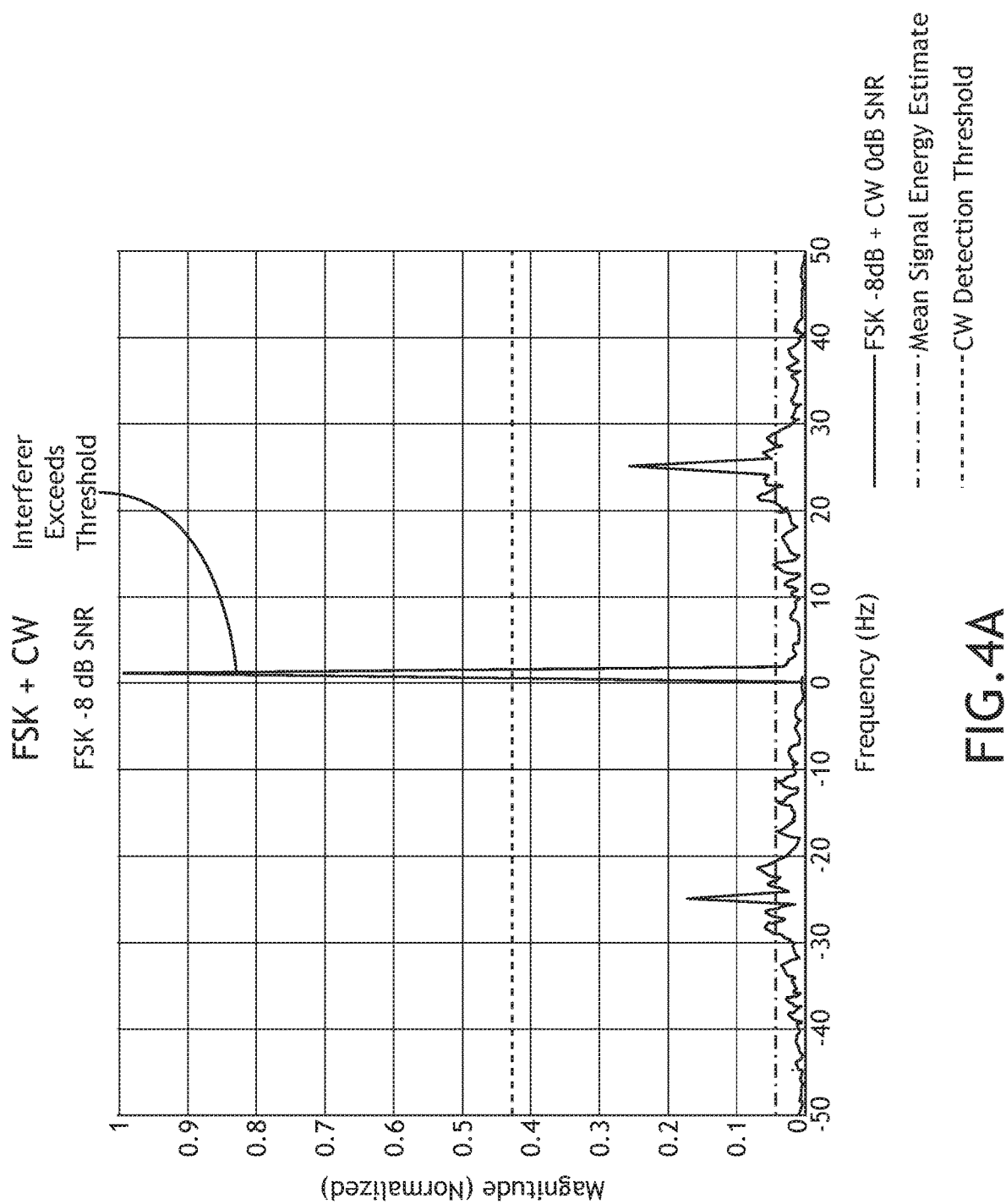
FIGS. 4A and 4B show exemplary graphs of a comparison of FSK and minimum shift keying (MSK) waveforms with interferers of an exemplary embodiment of a method according to the inventive concepts disclosed herein.
Figure 4B:
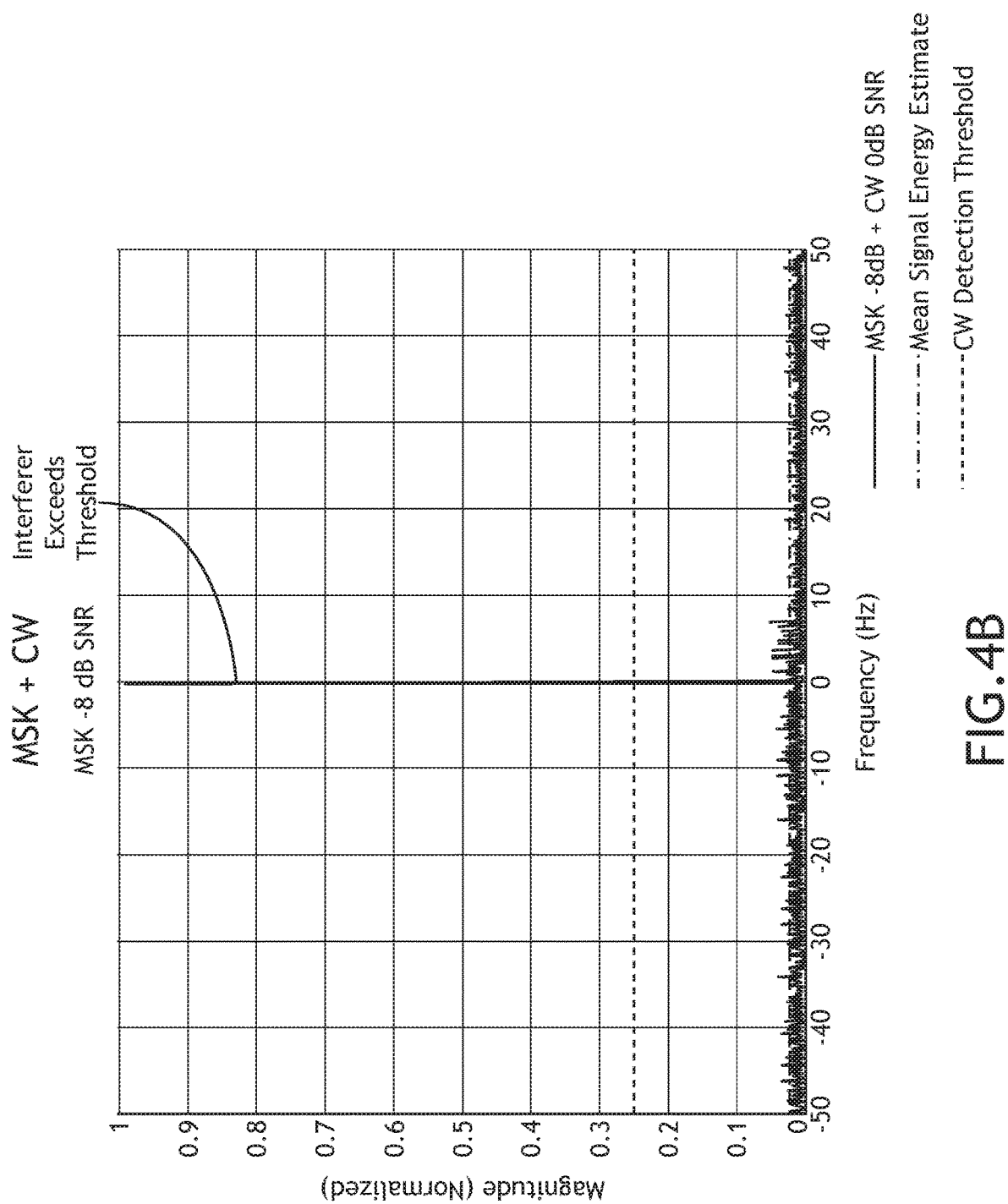
Figure 5A:
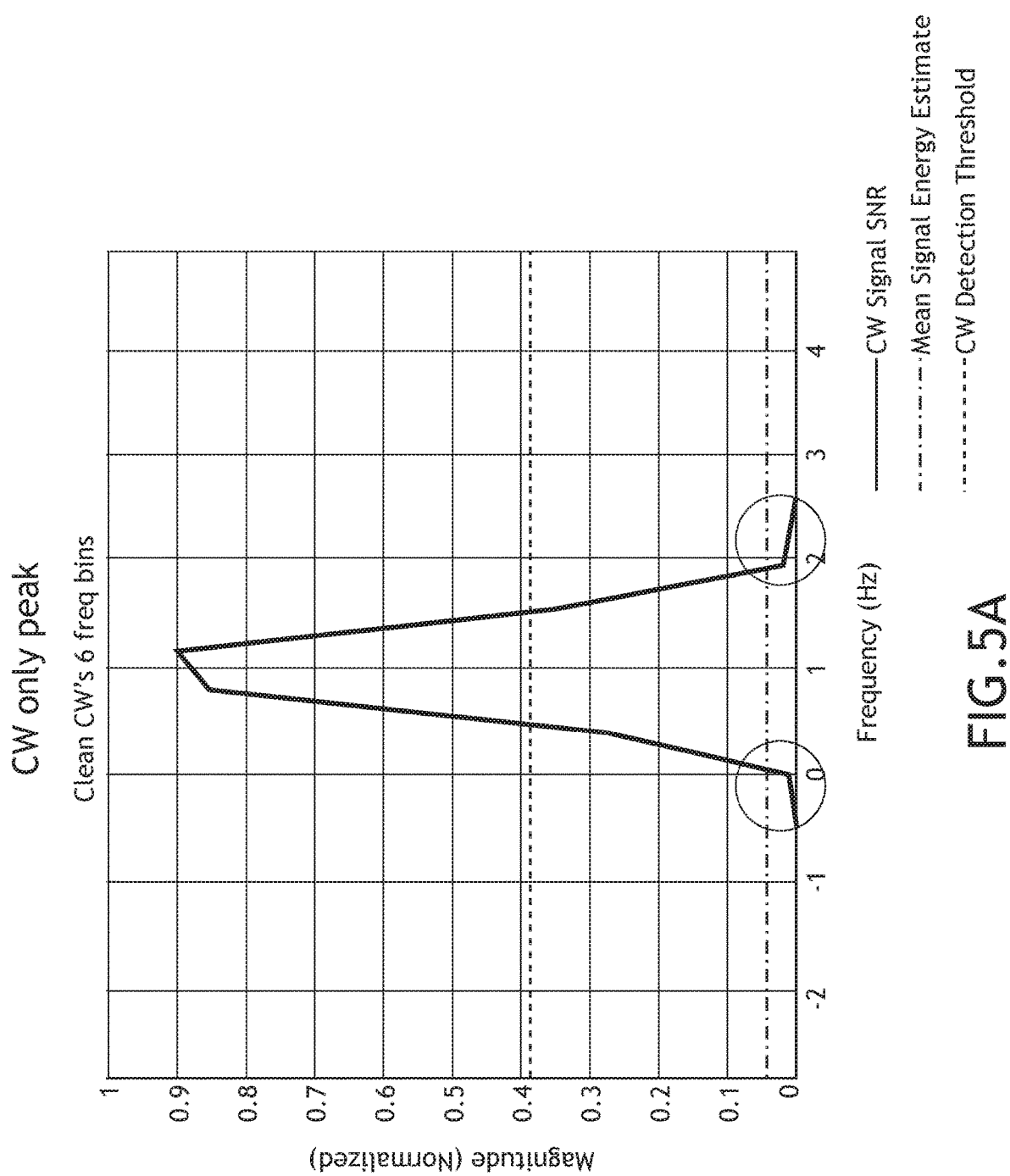
FIGS. 5A, 5B, and 5C show examples of graphs related to peak detection according to the inventive concepts disclosed herein.
Figure 5B:
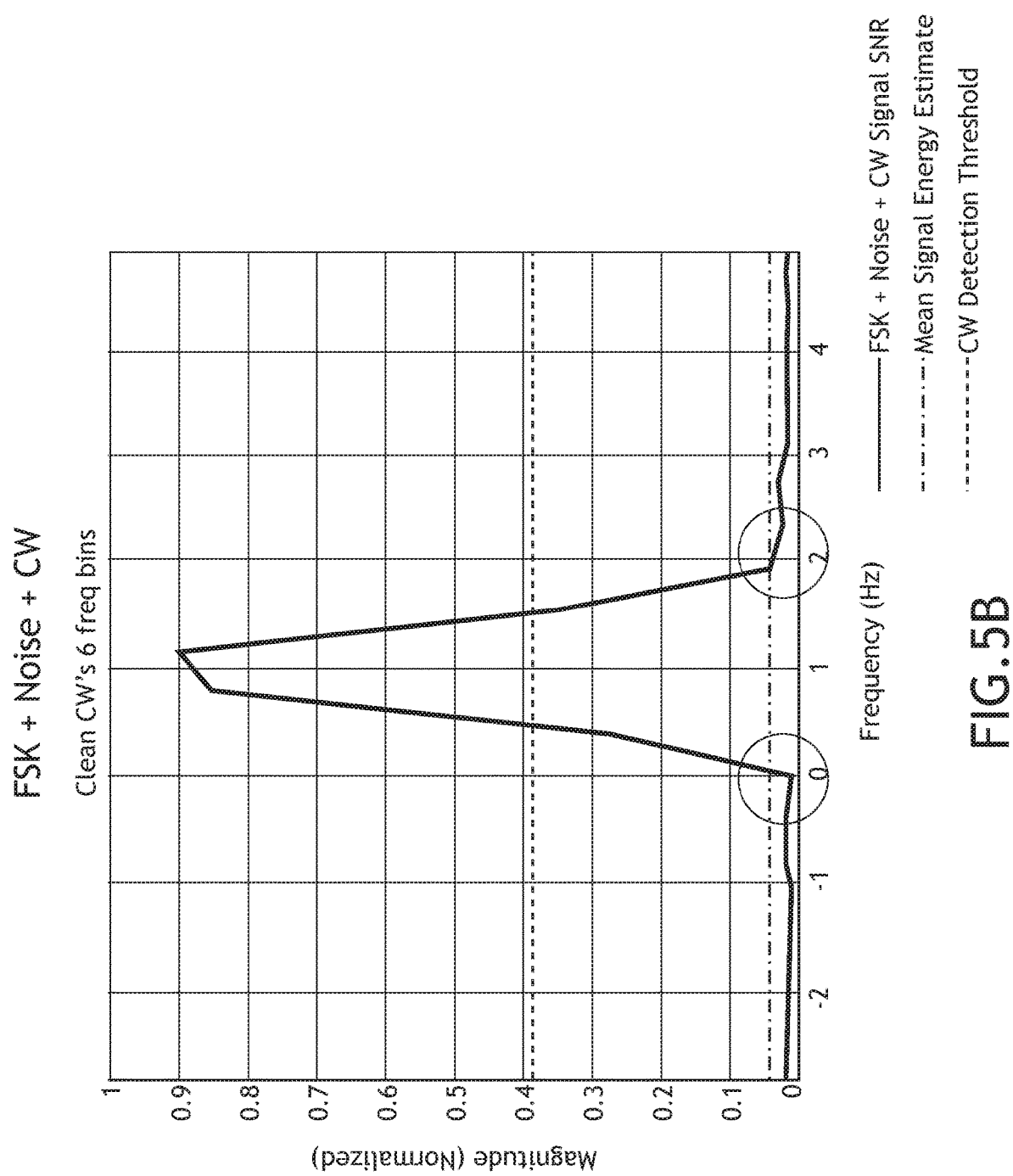
Figure 5C:
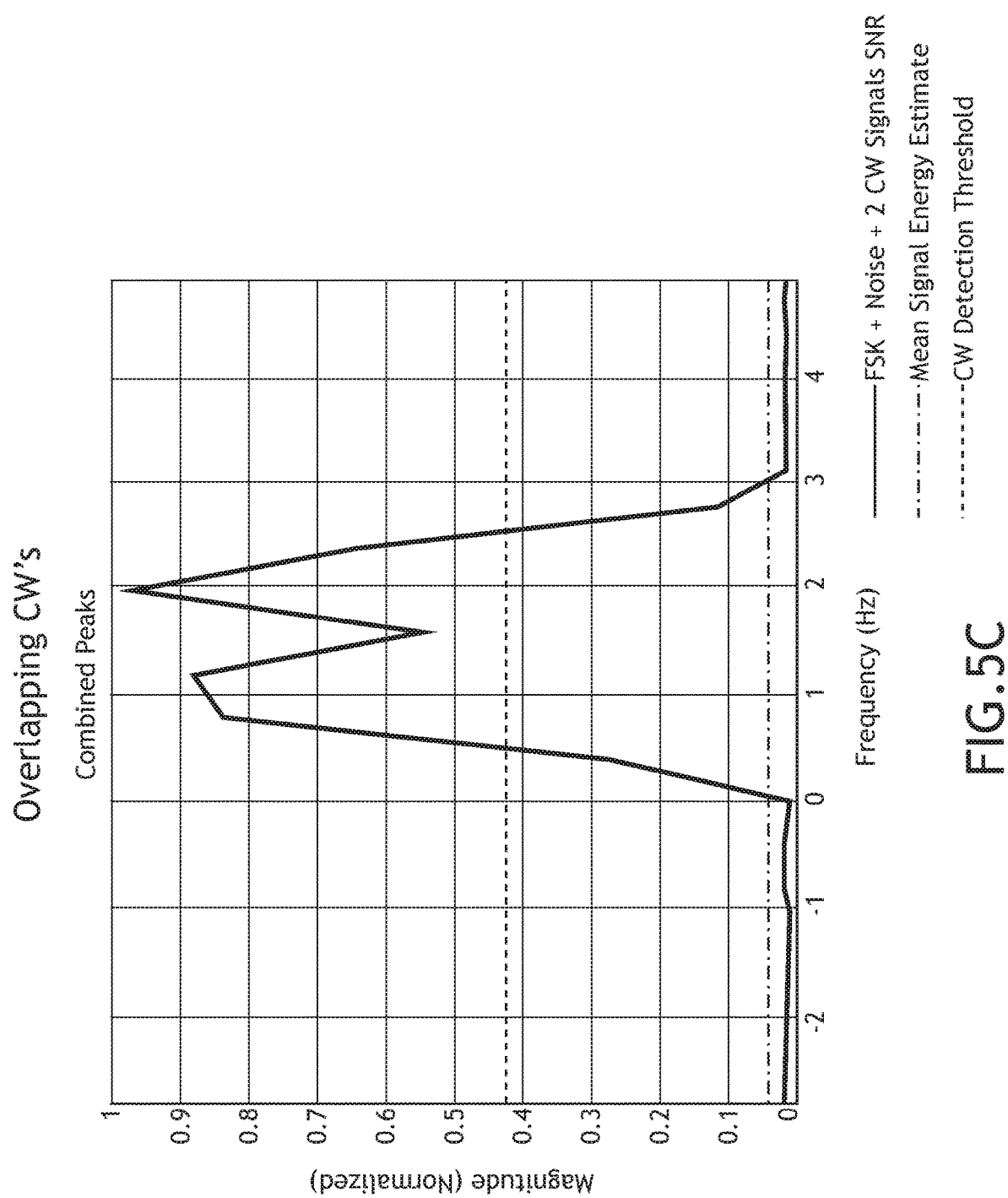

With respect to the calculate interferer threshold 208, the processor 104 may be configured to calculate an interferer detection threshold (IDT) by using the frequency domain signal, S(f). In an exemplary embodiment, the calculation of the IDT may be designed around the FSK waveform. FIGS. 3A and 3B show exemplary graphs related to calculating the interferer detection threshold. As shown in FIGS. 3A and 3B, the peaks in the transmission region may be averaged to get a baseline, which may be scaled up (e.g., by 20 decibels (dB)) to exclude the FSK peaks from detection. Depending on the bits transmitted, the FSK peaks may vary slightly in magnitude. As part of the verification process, the peaks should be detected consistently over several iterations of the filter process to prevent random magnitude spikes in the FSK peak from causing false detections. As shown in FIGS. 4A and 4B, a comparison of FSK and minimum shift keying (MSK) waveforms with interferers is shown. Since the MSK waveform typically has a lower profile, a relative threshold may be lower in the absence of an FSK waveform. The Spectral Peaks algorithm may take advantage of a reduced profile of the MSK waveforms and can change the threshold's scale setting for this case. With respect to the detect peaks 210, the processor 104 may be configured to search for and identify peaks of possible interferers by using the frequency domain signal, S(f), and the IDT. FIGS. 5A, 5B, and 5C show examples of graphs related to peak detection. All peaks that exceed the threshold may be identified. Once a peak is found, the peak's extents may be defined. For example, far extents of a CW peak may be small and not always visible in noise; however, if ignored, the far extents may begin to jam the signal at larger CW amplitudes. Overlapping CWs may be combined to represent a single larger area. This larger area may be used for matching and later for removal.

With respect to the peak list 212, the processor 104 may be configured to store identified peaks in a peak list, wherein previously detected peaks are stored in the peak list.

Figure 6A:
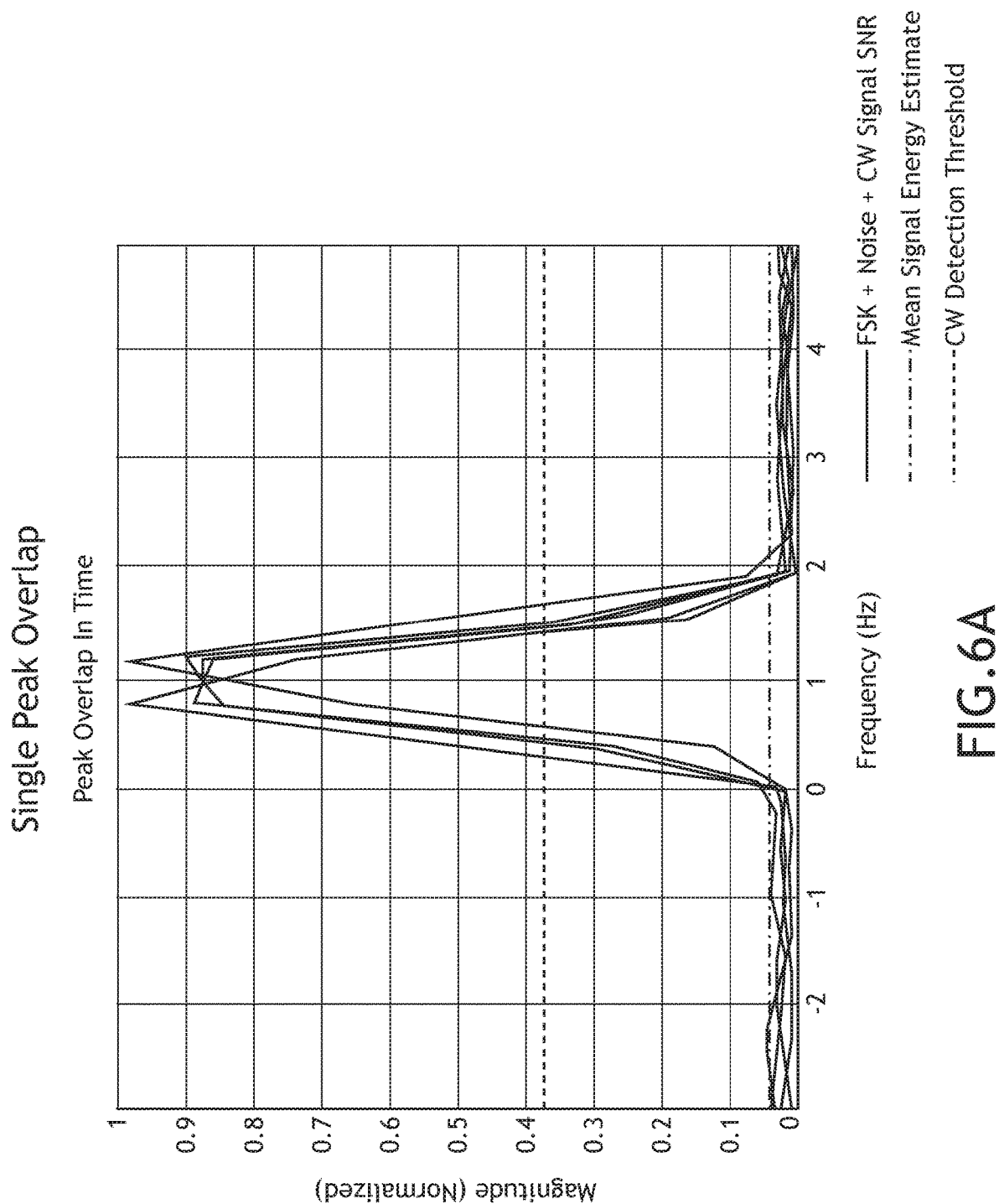
FIGS. 6A and 6B show examples of graphs related to peak comparison, consolidation, and verification according to the inventive concepts disclosed herein.
Figure 6B:
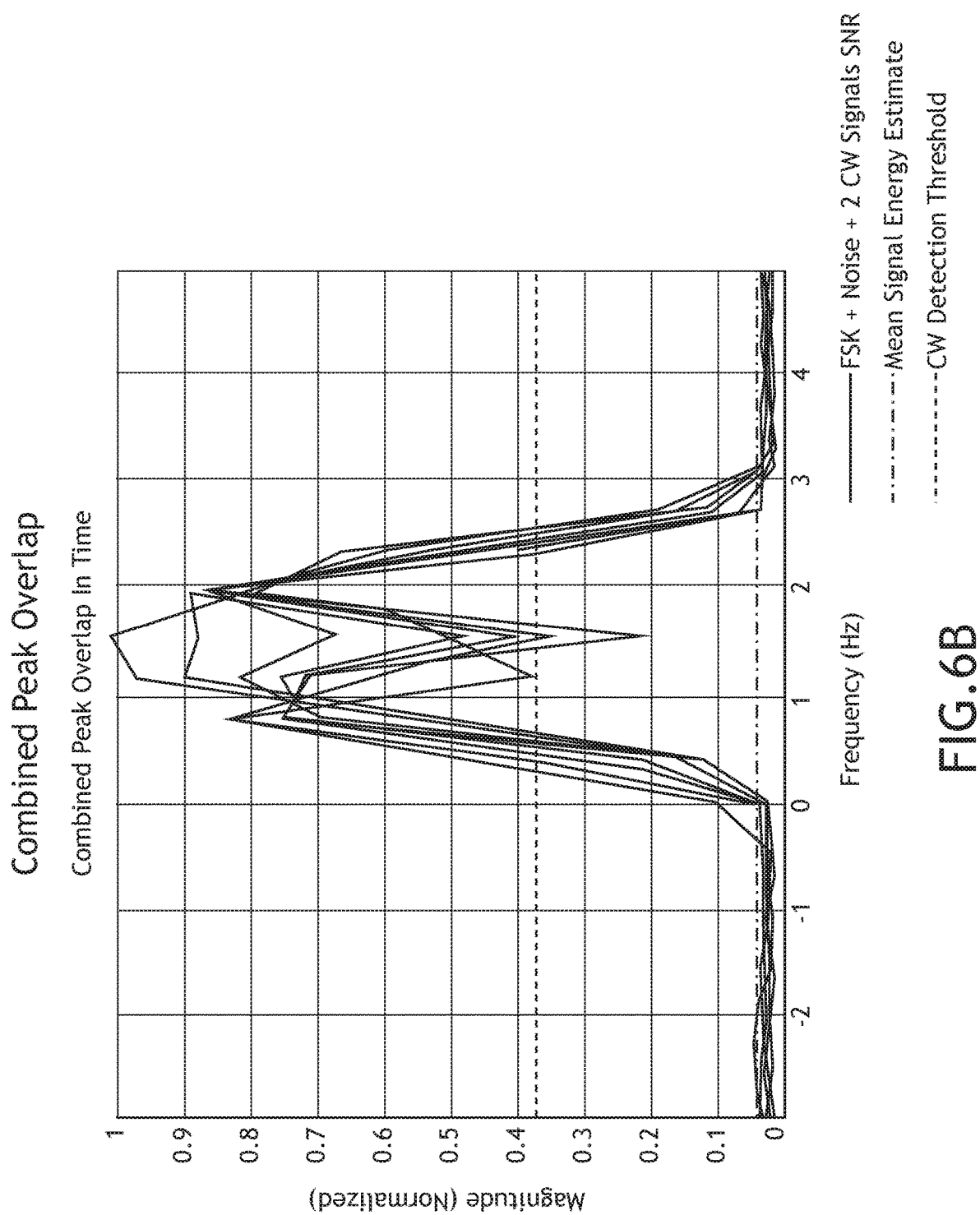

With respect to the match peaks 214, the processor 104 may be configured to match newly detected peaks with previously detected peaks to determine persistence. FIGS. 6A and 6B show examples of graphs related to peak comparison, consolidation, and verification. From FFT to FFT, a given CWs peaks may vary due to velocity, position, noise, etc. Such variance may cause slight changes in observed magnitude and frequency. In an exemplary embodiment, when the CWs 6 bins overlap across executions, the CW may be considered matched. Peaks that do not match previous peaks may be added to the peak list for future matching. For example, each observance of a peak may count toward persistence credit, up to a maximum of 1 second, though any suitable value can be used for persistence. For example, once observed for 1 second, the peak may be considered verified. If not observed, a previous peak may lose credit; once all credit is lost, the peak may be removed from the peak list.

With respect to the confirm peaks 216, the processor 104 may be configured to determine a peak to be a confirmed peak once the peak has persisted for a predetermined amount of time.

With respect to the check unmatched peaks 218, the processor 104 may be configured to remove a stored peak from the peak list when the stored peak no longer matches current peaks.

Figure 7A:
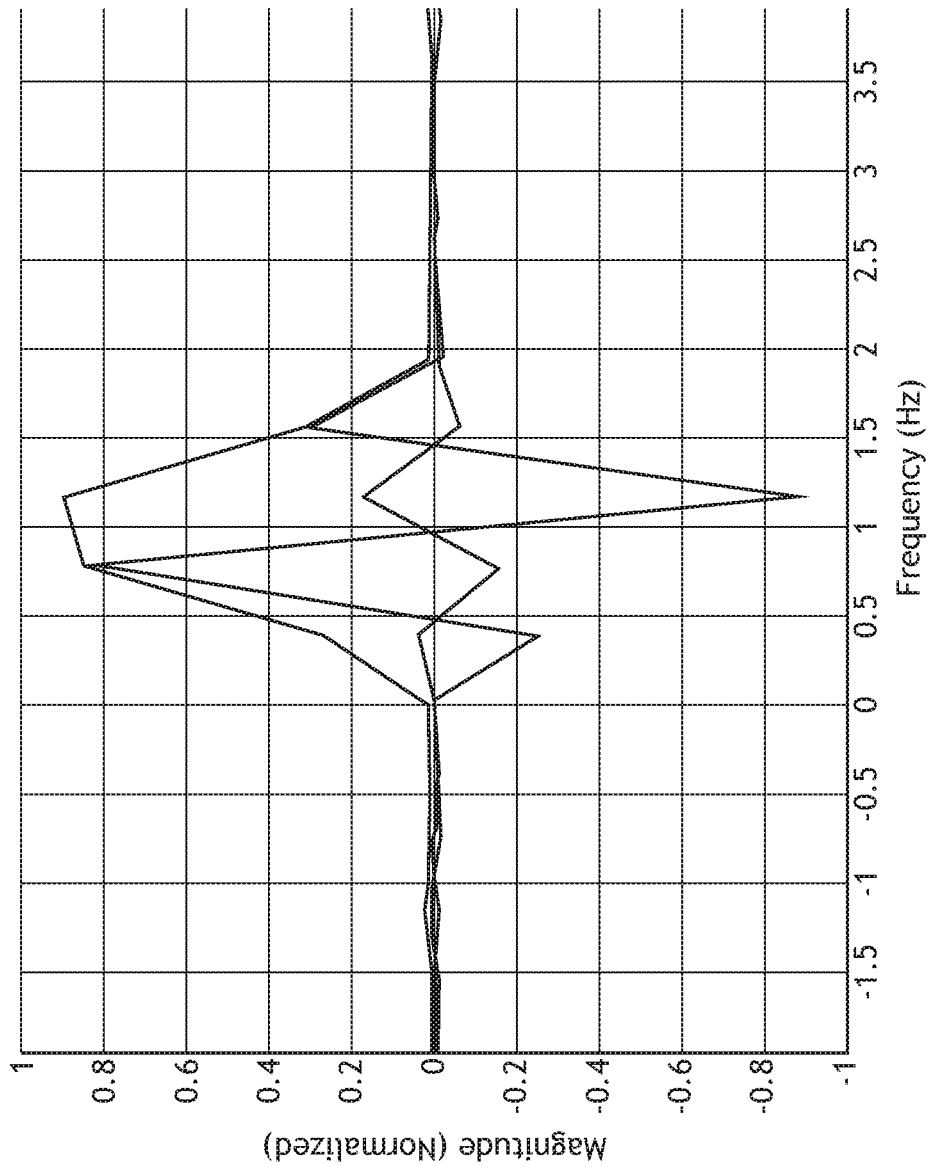
FIGS. 7A, 7B, and 7C show exemplary graphs related to peak removal according to the inventive concepts disclosed herein.
Figure 7B:
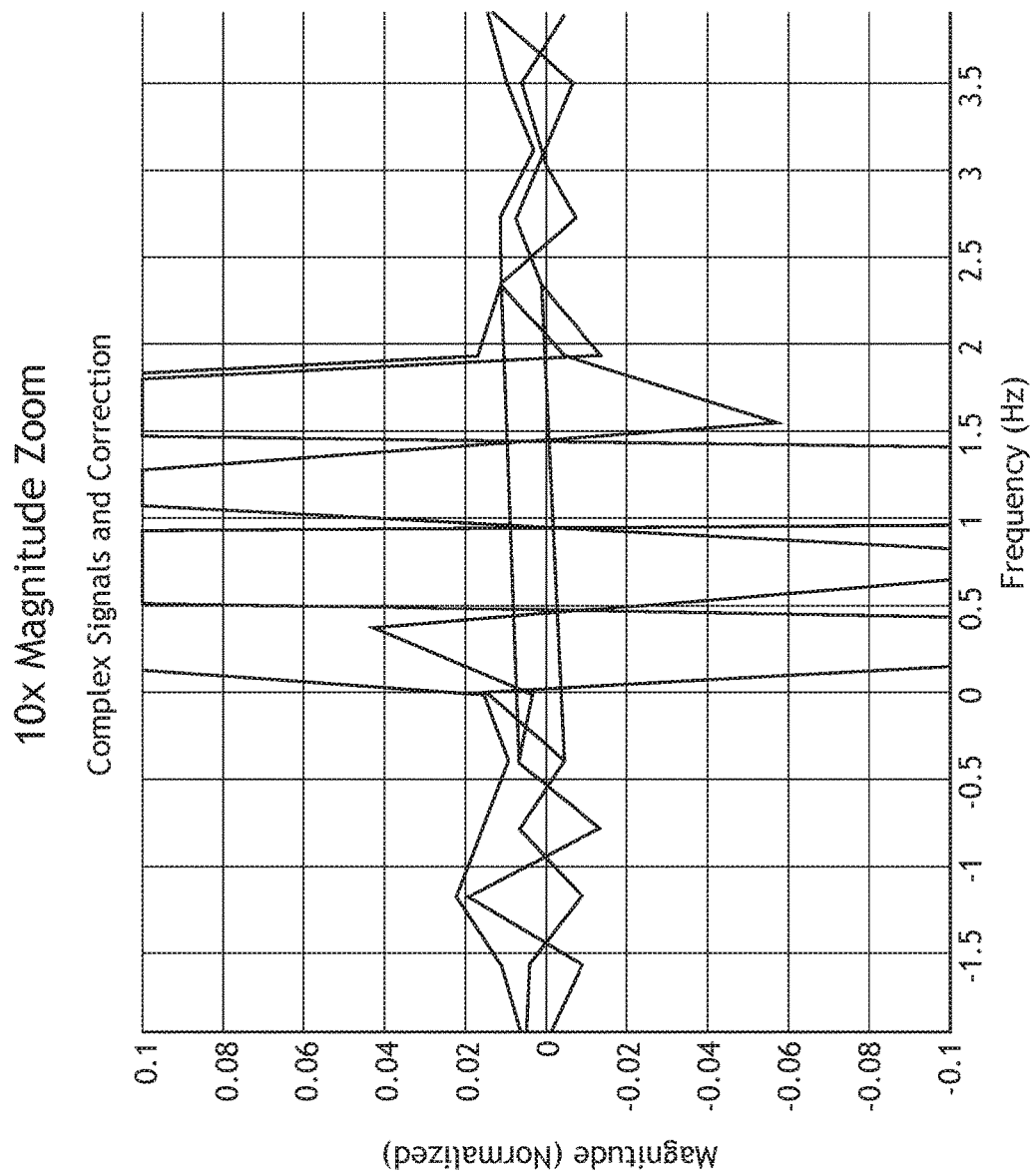
Figure 7C:
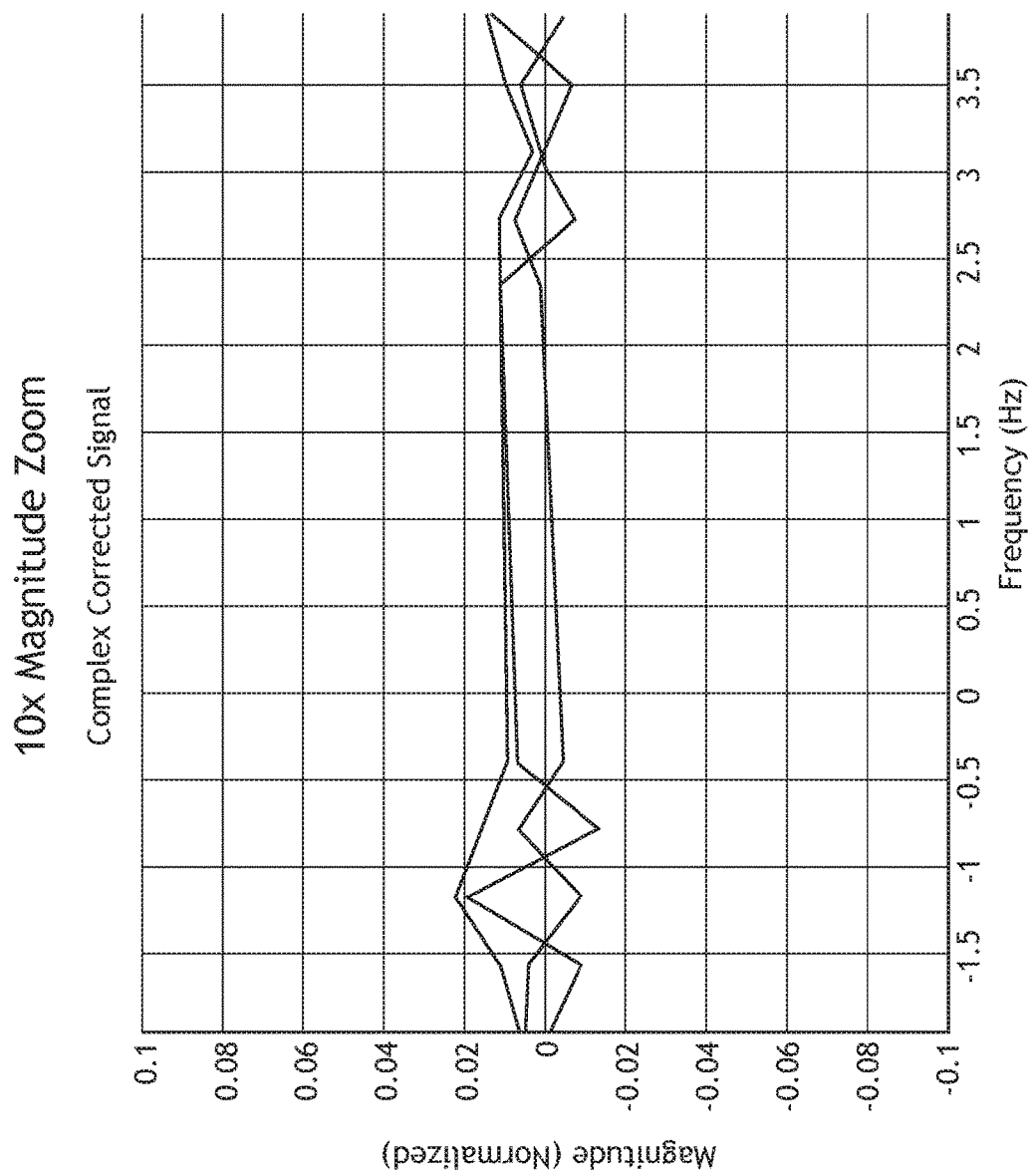

With respect to the remove peaks 220, the processor 104 may be configured to remove the confirmed peak from the frequency domain signal, S(f), to produce a corrected frequency domain signal, S'(f). FIGS. 7A, 7B, and 7C show exemplary graphs related to peak removal. Magnitude values associated with verified jammers may be replaced with interpolated values based on noise values on either side of the interferer peak. Peak removal may be performed for all confirmed peaks.

With respect to the IFFT 222, the processor 104 may be configured to perform an inverse FFT to transform the corrected frequency domain signal, S'(f), to a corrected time domain signal, s'(t). Once CW peaks have been removed, the signal may be converted back to the time domain via an IFFT.

With respect to the inverse window operation (e.g., the inverse Blackman window 224), the processor 104 may be configured to perform an inverse window operation (e.g., an inverse Blackman window operation) on the corrected time domain signal, s'(t), to recover original signal magnitudes. While in some embodiments the inverse window operation may be an inverse Blackman window operation, other embodiments may use any suitable inverse window operation. For example, an inverse Blackman window operation may be applied to minimize amplitude distortion created by the Blackman window. Each additional frame used between executions may require a larger scale to recover an original value. A larger scale factor may magnify process noise for that measurement. For example, for an 8K Blackman window, the maximum scale factor for 16 frames (+/−8) may be approximately 106.6%.

The bypass switch 226 may be engaged by the processor 104 if no peaks were confirmed in the step of confirm peaks 216. If engaged, an original unprocessed signal may be passed through to the output with the same latency as the processed signal. For example, the processor 104 may be configured to perform a bypass operation to output an unprocessed time domain signal if the unprocessed time domain signal lacks confirmed peaks, wherein the outputted unprocessed time domain signal has a same latency as a processed signal. In some embodiments, the bypass switch 226 may be implemented in the processor 104.

With respect to the digitized data selector (e.g., the frame selector 228), the processor 104 may be configured to execute the Spectral Peaks algorithm once every X frames to reduce processor load. For example, at the end of each execution, X frames of data may be produced and received by the frame selector 228. The frame selector 228 may be configured to output a single frame to the output frame buffer 230 for every frame of input consumed by the input frame buffer 202. In some embodiments, the frame selector 228 may be implemented in the processor 104.

The output digitized data buffer (e.g., the output frame buffer 230) may output digitized data (e.g., frames) for downstream signal processing. In some embodiments, the at least one memory 106 includes the output frame buffer 230. In some embodiments, the output frame buffer 230 may be implemented within the processor 104. In an exemplary embodiment, the center 16 frames of processed data may be retained and sent to the output frame buffer 230, which may dole the frames out. For example, the center 16 frames may be the least distorted by the window (e.g., the Blackman window). The number of center frames could be increased to reduce overlap and average processor loading but at the expense of introducing more distortion. Performance of the Spectral Peaks algorithm may be repeated for the next 16 frames (e.g., 320 ms).

Figure 8:
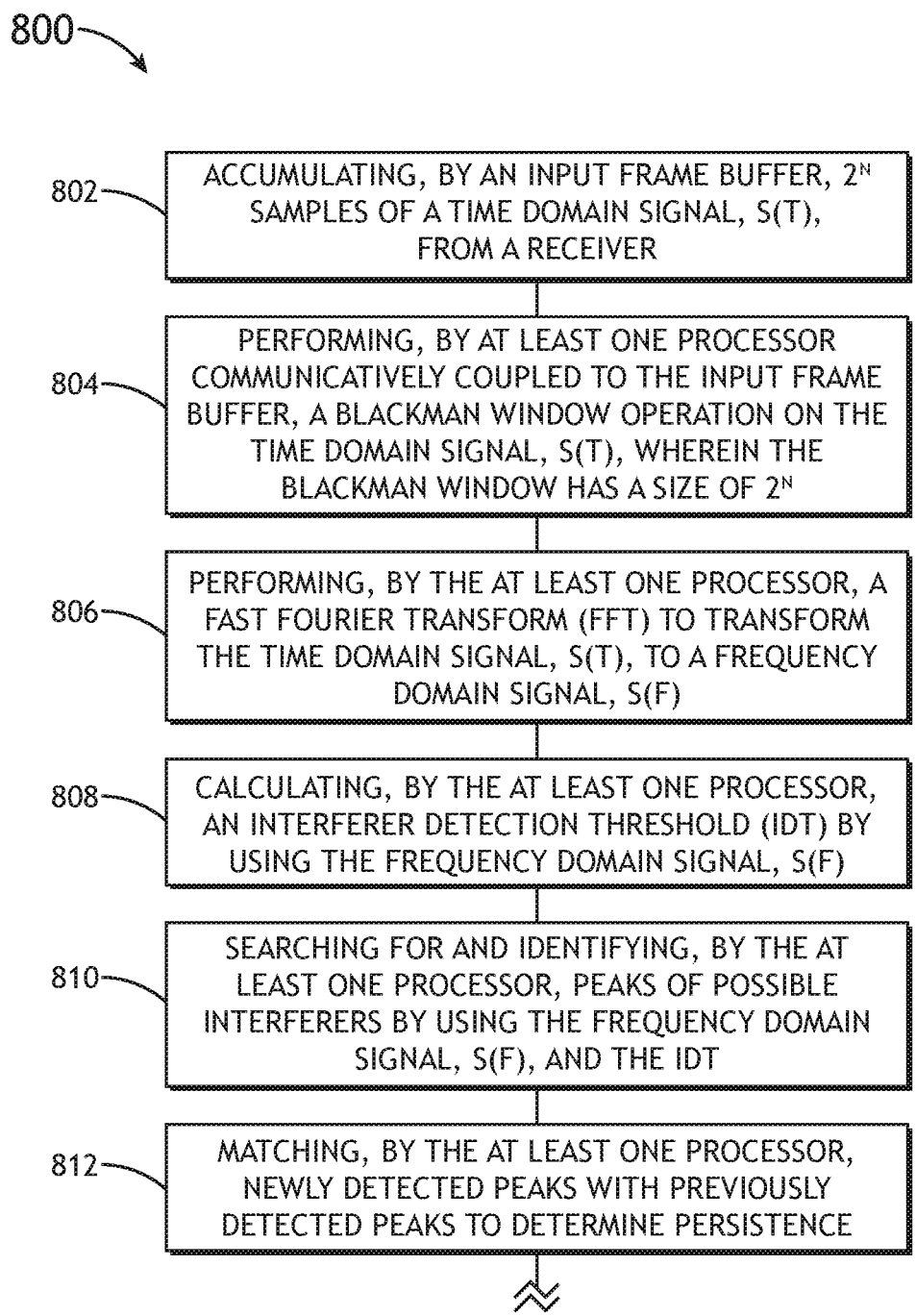
FIG. 8 is a diagram of an exemplary embodiment of a method according to the inventive concepts disclosed herein.
Figure 8:
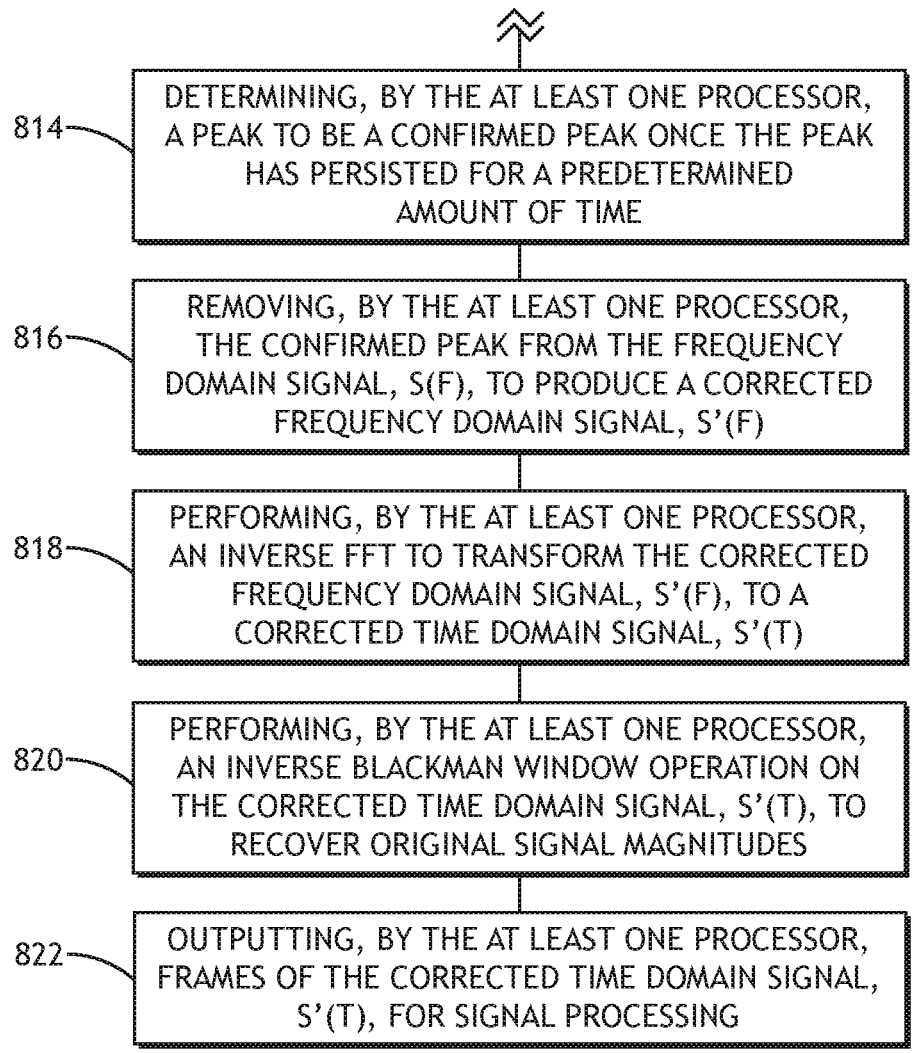

Referring now to FIG. 8, an exemplary embodiment of a method 800 according to the inventive concepts disclosed herein may include one or more of the following steps. Additionally, for example, some embodiments may include performing one more instances of the method 800 iteratively, concurrently, and/or sequentially. Additionally, for example, at least some of the steps of the method 800 may be performed in parallel and/or concurrently. Additionally, in some embodiments, at least some of the steps of the method 800 may be performed non-sequentially.

A step 802 may include accumulating, by an input frame buffer, $2^N$ samples of a time domain signal, s(t), from a receiver.

A step 804 may include performing, by at least one processor communicatively coupled to the input frame buffer, a Blackman window operation on the time domain signal, s(t), wherein the Blackman window has a size of $2^N$.

A step 806 may include performing, by the at least one processor, a fast Fourier transform (FFT) to transform the time domain signal, s(t), to a frequency domain signal, S(f).

A step 808 may include calculating, by the at least one processor, an interferer detection threshold (IDT) by using the frequency domain signal, S(f).

A step 810 may include searching for and identifying, by the at least one processor, peaks of possible interferers by using the frequency domain signal, S(f), and the IDT.

A step 812 may include matching, by the at least one processor, newly detected peaks with previously detected peaks to determine persistence.

A step 814 may include determining, by the at least one processor, a peak to be a confirmed peak once the peak has persisted for a predetermined amount of time.

A step 816 may include removing, by the at least one processor, the confirmed peak from the frequency domain signal, S(f), to produce a corrected frequency domain signal, S'(f).

A step 818 may include performing, by the at least one processor, an inverse FFT to transform the corrected frequency domain signal, S'(f), to a corrected time domain signal, s'(t).

A step 820 may include performing, by the at least one processor, an inverse Blackman window operation on the corrected time domain signal, s'(t), to recover original signal magnitudes.

A step 822 may include outputting, by the at least one processor, frames of the corrected time domain signal, s'(t), for signal processing.

Further, the method 800 may include any of the operations disclosed throughout.

As will be appreciated from the above, embodiments of the inventive concepts disclosed herein may be directed to a method and a system configured to remove interferer signals.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a receiver;
an input digitized data buffer configured to accumulate samples of a time domain signal, s(t), from the receiver; and
at least one processor, the at least one processor configured to:
perform a window operation on the time domain signal, s(t);
perform a fast Fourier transform (FFT) to transform the time domain signal, s(t), to a frequency domain signal, S(f);
calculate an interferer detection threshold (IDT) by utilizing the frequency domain signal, S(f);
search for and identify peaks of possible interferer signals by utilizing the frequency domain signal, S(f), and the IDT;
match newly detected peaks with previously detected peaks to determine persistence;
determine a peak to be a confirmed peak once the peak has persisted for a predetermined amount of time;
remove the confirmed peak from the frequency domain signal, S(f), to produce a corrected frequency domain signal, S'(f);
perform an inverse FFT (IFFT) to transform the corrected frequency domain signal, S'(f), to a corrected time domain signal, s'(t);
perform an inverse window operation on the corrected time domain signal, s'(t), to recover original signal magnitudes; and
output digitized data of the corrected time domain signal, s'(t), for signal processing.

2. The system of claim 1, wherein the at least one processor is further configured to store the identified peaks in a peak list, wherein the previously detected peaks are stored in the peak list.

3. The system of claim 2, wherein the at least one processor is further configured to remove a stored peak from the peak list when the stored peak no longer matches current peaks.

4. The system of claim 1, wherein the window operation is a Blackman window operation, wherein performance of the Blackman window operation comprises multiplying elements in the time domain signal, s(t), by a corresponding scalar in a Blackman window.

5. The system of claim 1, further comprising an output digitized data buffer, wherein the at least one processor is further configured to output a single frame to the output digitized data buffer for every frame of input consumed by the input digitized data buffer.

6. The system of claim 1, wherein the at least one processor being configured to remove the confirmed peak from the frequency domain signal, S(f), to produce the corrected frequency domain signal, S'(f), further comprises the at least one processor being configured to: replace magnitude values associated with a verified jammer signal with interpolated values based on noise values on either side of an interferer signal peak.

7. The system of claim 1, wherein the at least one processor is further configured to perform a bypass operation to output an unprocessed time domain signal when the unprocessed time domain signal lacks confirmed peaks.

8. The system of claim 7, wherein the outputted unprocessed time domain signal has a same latency as a processed signal.

9. The system of claim 1, wherein the at least one processor is further configured to process multiple frames of data simultaneously and to output multiple frames of the corrected time domain signal, s'(t), simultaneously.

10. The system of claim 1, wherein the at least one processor comprises a general-purpose processor.

11. The system of claim 1, wherein the at least one processor comprises a field-programmable gate array (FPGA).

12. The system of claim 1, wherein the at least one processor comprises a digital signal processor (DSP).

13. The system of claim 1, further comprising an output digitized data buffer, wherein the at least one processor is further configured to store the identified peaks in a peak list, wherein the previously detected peaks are stored in the peak list, wherein the at least one processor is further configured to remove a stored peak from the peak list when the stored peak no longer matches current peaks, wherein the window operation is a Blackman window operation, wherein performance of the Blackman window operation comprises multiplying elements in the time domain signal, s(t), by a corresponding scalar in a Blackman window, wherein the at least one processor is further configured to output a single frame to the output frame buffer for every frame of input consumed by the input frame buffer, wherein the at least one processor is further configured to output the digitized data of the corrected time domain signal, s'(t), for signal processing.

14. The system of claim 1, wherein the system is a vehicular system.

15. A method, comprising:
   accumulating, by an input digitized data buffer, samples of a time domain signal, s(t), from a receiver;
   performing, by at least one processor, a window operation on the time domain signal, s(t);
   performing, by the at least one processor, a fast Fourier transform (FFT) to transform the time domain signal, s(t), to a frequency domain signal, S(f);
   calculating, by the at least one processor, an interferer detection threshold (IDT) by utilizing the frequency domain signal, S(f);
   searching for and identifying, by the at least one processor, peaks of possible interferer signals by utilizing the frequency domain signal, S(f), and the IDT;
   matching, by the at least one processor, newly detected peaks with previously detected peaks to determine persistence;
   determining, by the at least one processor, a peak to be a confirmed peak once the peak has persisted for a predetermined amount of time;
   removing, by the at least one processor, the confirmed peak from the frequency domain signal, S(f), to produce a corrected frequency domain signal, S'(f);
   performing, by the at least one processor, an inverse FFT (IFFT) to transform the corrected frequency domain signal, S'(f), to a corrected time domain signal, s'(t);
   performing, by the at least one processor, an inverse window operation on the corrected time domain signal, s'(t), to recover original signal magnitudes; and
   outputting, by the at least one processor, digitized data of the corrected time domain signal, s'(t), for signal processing.

* * * * *